Patented Oct. 17, 1922.

1,432,387

UNITED STATES PATENT OFFICE.

HEINRICH DANNEEL AND EMIL LÜSCHER, OF BASEL, SWITZERLAND, ASSIGNORS TO ELEKTRIZITÄTSWERK LONZA, OF GAMPEL, CANTON OF VALAIS, AND BASEL, SWITZERLAND.

MANUFACTURE OF METALDEHYDE.

No Drawing. Application filed February 21, 1922. Serial No. 538,341.

*To all whom it may concern:*

Be it known that we, HEINRICH DANNEEL, a citizen of the German Republic, and EMIL LÜSCHER, a citizen of the Swiss Republic, both residents of Basel, Switzerland, have invented new and useful Improvements in the Manufacture of Metaldehyde, of which the following is a full, clear, and exact specification.

Metaldehyde prepared from acetaldehyde is liable to lose weight, the loss being more rapid in proportion as the temperature is higher; for example, although the loss at, or about, 20° centigrade is hardly noticeable it becomes appreciable at temperatures above say 30° centigrade.

We have found the said loss to be due to the presence of small traces of the matter used as catalyzer for transforming acetaldehyde into metaldehyde, such traces being carried down by the precipitated metaldehyde, more especially when the precipitation occurs suddenly, particles of catalyzer being then enveloped by the crystals of metaldehyde, so that these particles cannot be separated from the metaldehyde by ordinary washing.

According to this invention the stability of metaldehyde at high temperatures is improved by rendering harmless the residual traces of the catalyzer still retained therein.

This can be effected either by transforming the residual traces of the catalyzer which are not removable by washing, into substances devoid of catalytic action; or by preventing the catalyzer coming into action by removing the liquid (chiefly paraldehyde) adhering to the metaldehyde, the action of the catalyzer being dependent upon the possibility of solution. There are several ways of carrying out this invention, including the diminution of the activity of the catalyzer by other agents, acting chemically, or physically, such as catalyst poisons, the addition of collodial substances and the like.

The catalyzer can, for example, be converted into a chemical compound which is insoluble in paraldehyde and also (as far as possible) in water. For instance, if sulfuric acid has been used as the catalyzer, it can be transformed into the insoluble barium sulfate by means of barium hydroxide, barium carbonate, or other barium salt. If hydrochloric acid has been the catalyzer, it may be converted by a silver salt into silver chloride, and so on. The same result can be obtained by transforming the sulfuric acid into a salt which, though it may be soluble, has no catalytic action.

The adherent paralydehyde can be in part removed by washing it out for example by means of a solvent, in which the paraldehyde is soluble, and which is itself either readily volatile, or capable of being washed out by a volatile liquid. We instance acetaldehyde as an example although washing with acetaldehyde does not effect the complete disappearance of the paraldehyde; but the entire removal of this latter can be effected by placing the product in a vacuum at a moderate temperature, say for example, one of from 20° to 25° centigrade.

In order to make certain that the object is perfectly attained, both the aforesaid means may be employed, the catalyzer being transformed into a chemical compound which does not act catalytically, and the adherent paraldehyde being eliminated also.

The results of the invention are illustrated by the following experiment.

Large pressed blocks of metaldehyde were kept together, for example, for several days in succession, at a constant temperature of 35° centigrade, the loss in weight being ascertained by weighing:

The losses amounted to:

Block of metaldehyde prepared in the ordinary way, 2.6 g.

Block of metaldehyde washed with acetaldehyde, 1.6 g.

Block of metaldehyde treated with baryta water, 0.6 g.

Block of metaldehyde warmed in vacuo, 0.12 g.

What we claim is:—

1. As a new article of manufacture the herein described metaldehyde having an improved stability at high temperatures, the residual traces of catalyzer remaining therein being rendered harmless.

2. The herein described improvement in the manufacture of metaldehyde consisting in transforming the traces of catalyzer contained in the metaldehyde into a chemical compound which has no catalytic action.

3. The herein described improvement in the manufacture of metaldehyde consisting in eliminating the paralydehyde still adhering to the metaldehyde.

4. The herein described improvement in the manufacture of metaldehyde consisting in eliminating the paraldehyde still adhering to the metaldehyde and in transforming the traces of catalyzer contained in the metaldehyde into a chemical compound which has no catalytic action.

In witness whereof we have hereunto signed our names this 9th day of February, 1922, in the presence of two subscribing witnesses.

HEINRICH DANNEEL.
EMIL LÜSCHER.

Witnesses:
 FRISHE KURZ,
 AMAND RITTER.